D. R. PRINDLE.
Agricultural Boiler.
No. 864. Reissued Dec. 13, 1859.
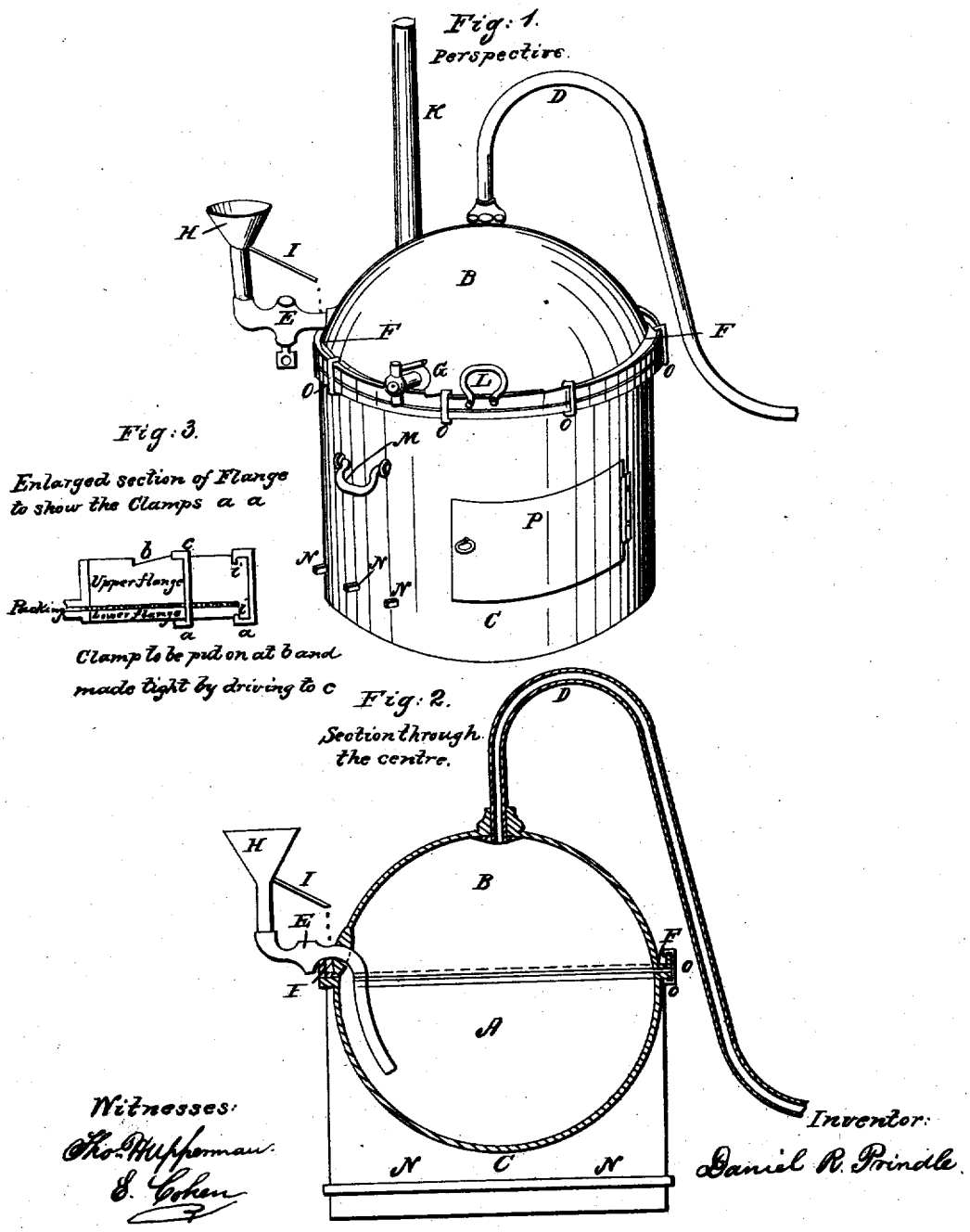
Witnesses:
Thos. Huppeman
S. Cohen
Inventor:
Daniel R. Prindle
N. PETERS, Photo-Lithographer, Washington, D. C.

UNITED STATES PATENT OFFICE.

DANIEL R. PRINDLE, OF BETHANY, NEW YORK.

IMPROVEMENT IN BOILERS AND STEAMERS.

Specification forming part of Letters Patent No. 25,442, dated September 13, 1859; Reissue No. 864, dated December 13, 1859.

*To all whom it may concern:*

Be it known that I, DANIEL R. PRINDLE, of Bethany, in the county of Genesee and State of New York, have invented a new and improved combined apparatus for the double purpose of boiling and of generating steam, especially for farmers' use; and I do hereby declare that the following is a full and exact description thereof, reference being had to the accompanying drawings, making part of this specification—

Figure 1 being a view in perspective of the entire apparatus as arranged for generating steam; Fig. 2, a central vertical section thereof similarly arranged; Fig. 3, a view, on a larger scale, of a part detached.

Like letters designate corresponding parts in all the figures.

The object of my invention is to produce a single apparatus which will be applicable at pleasure to either of the purposes designated, and which will fulfill, in a practical and efficient manner, particularly the conditions of portability, so that it can be readily shifted from place to place, wherever its use may be desired; of adjustability in place, so that it may be applied in any position, in whole or in respect to its parts, such as may be required; of strength and durability of construction, so that it may be used with entire safety and not be liable to require continual repairs, and of simplicity in arrangement and action, so that farmers of ordinary experience and capacity, and with means and tools commonly at hand, may manage it with ease and readiness.

The nature of my invention consists in such a construction of all parts and their adaptation to each other that the above objects and conditions shall be attained very cheaply and effectually.

The main parts of the apparatus are the boiler and its support. The boiler is made in two sections, A and B, the former resting immediately upon the support C and the latter resting on the former section, as shown. The lower section, A, is used separately when articles or substances are to be boiled or heated, and when thus separately employed it may be called the "caldron." When steam is to be generated and employed for any purpose, the upper section, B, is secured to the lower section and both together compose a "steam-generator." The form of the two sections together should be spherical or spheroidal—that is, of a form so nearly approximating to that of a sphere as to fulfill the conditions of construction and use of all the parts of the apparatus, as herein specified. One main and essential condition of construction is that the open edges or rims of both sections, respectively, shall be provided with outwardly-projecting flanges *e f*, for the purpose of uniting and sustaining the sections, and that these flanges shall be upon the widest parts of the respective sections. Another condition of construction is that the sections shall be of lessening size or breadth immediately from the flanges, so that the use of all the parts may be facilitated. The flanges of both sections project outwardly nearly or exactly the same distance sufficiently to conveniently accomplish the purposes of their use, and both flanges respectively have lips turned at right angles away from their adjacent surfaces, substantially as represented. The lip on the lower flange, *e*, is required to project only a very little, but the lip projecting upward from the flange *f* of the section or cover B is required to be of greater height, so as to furnish an annular trough, F, of sufficient depth to hold a small quantity of water all round. In the edge of either lip (generally of the lip on the upper flange, *f*) is formed a suitable number of notches, *b b*, gradually inclined on one side, but either abrupt or not on the other side, substantially as shown in the drawings. These notches are for the purpose of receiving an equal number of clamps, *o o*, and of offering wedge acting surfaces thereto, in order to bind the two sections A B closely and securely together. The clamps *o o* have their ends turned or bent at right angles, and on the extremities thereof have short hooks or projections *i*, turned toward each other, as seen on the detached clamp in Fig. 3. The distance between these hooks or projections is such that after one is placed around the lip of the flange *e* the other may be just passed through a notch, *b*, of the lip of the other flange in the deepest part thereof, and then, when the clamp is driven up over the inclined or wedge-acting side of the notch, the said hooks will hold over the edges of the lips, and thereby not allow the clamp to be got off by accident or otherwise, except by forcing it back through the said notch. Thus not only is a very effectual and simple method of uniting the sections obtained, but one which is not liable to be disarranged in handling or in using the apparatus, and one which does not, like bolts, interfere with the use of packing necessary to be inserted between the flanges before clamping, as indicated in Fig. 3. In order to protect this packing from excessive heat, the trough F is kept filled or supplied with water, which, by its constant evaporation, shall convey away the excess of heat. A convenient means of supplying the water continually is to employ a dripping-pipe, I, which receives its water from a vessel or funnel, H, through which also the inclosed boiler is supplied, when steam is to be generated. A pipe provided with a stop-cock, E, leading from the funnel or reservoir, is attached to the section B. Said section is also provided with a try-cock, G, so that the surface of the water within may always be kept above the joint between the sections, and thus further protect the packing. A steam-pipe, D, also extends from the top of the section B, and, that it may be more readily applied to convey steam to different places and distances, it may be flexible. The section B is also provided with handles L L, for greater convenience in turning, lifting, and carrying it. The lower section, A, requires no handles, its flange being sufficiently conveniently for moving it, and it is usually lifted and carried with the support beneath. The support C is also employed as the fire-box, whereby all brick or mason work is dispensed with. It consists of a simple periphery of sheet or thin cast metal, entirely open at both ends, and having a cylindrical form, or so nearly approaching that of a cylinder that its upper edge will closely fit around the section or caldron A, just below the flange *e* thereof. Thus, while it affords a strong and firm support for the caldron or complete boiler, it insures portability by its lightness, and does not interfere with the use of the flanges *e f*, nor of the clamps *o o*, either in clamping and unclamping, or in turning, moving, or lifting the sections together or separately, because, its edge only being presented thereto, it occupies scarcely any appreciable width of space beneath the flanges. For the same reason, also, it keeps nearly all of the flange *e* from the contact of the flame in the fire-box and of the heated support, leaving the said flange freely exposed to the open air, and consequently the packing between the flanges is further protected from injury by excessive heat. It is evident that no other kind of support that this open-top and thin-edge cylinder could effect these purposes. The open lower end of the support rests on the ground or floor. It has simple apertures in proper positions through its opposite sides to receive straight removable bars N N, which constitute the fire-gate. It also has a door, P, in one side for making and managing the fire, a smoke-pipe, K, on the opposite side, and handles M M, for moving, lifting, and carrying. The ashes may either be removed through the door P or by lifting the support or fire-box above or away from them. Thus all the parts are seen to be peculiarly and essentially adapted to each other, so as to compose together a very complete apparatus for the double object specified, which is very light, cheap, simple, compact, durable, safe, effectual, readily adjusted and applied, and easily managed.

I would remark that the trough F is not necessary to the purpose of uniting the sections A and B for a steam-generator, but only an additional feature to better protect the packing.

What I claim as my invention, and desire to secure by Letters Patent, is—

1. The construction and arrangement of the the two sections A and B, so that the section A may be used separately as a caldron, or both sections be securely united and employed as an inclosed boiler for generating steam, as herein specified.

2. The combination of a cylindrical or cylindroidal support and fire box C, entirely open at the top, with the uniting and supporting flanges *e f* of the spherical or spheroidal sections A B, constructed as described, so that by presenting a thin edge only to the flanges it allows the utmost facility of clamping and unclamping the sections, and of moving or adjusting the same, while it firmly sustains the boiler and shields the packing between the flanges from the heat of the fire, substantially as herein set forth.

3. The trough F, formed by the lip projecting above the upper flange, *f*, for the purpose of containing water to protect the packing between the flanges from injury by heat, substantially as described.

DANIEL R. PRINDLE.

Witnesses:
J. FRASER,
S. J. ALLIS.